UNITED STATES PATENT OFFICE.

JACOB BARAB, OF DOVER, NEW JERSEY, ASSIGNOR TO HERCULES POWDER COMPANY, OF WILMINGTON, DELAWARE, A CORPORATION OF DELAWARE.

PROCESS OF SEPARATING NUT-SHELLS FROM ADHERENT MEATS.

1,280,635.        Specification of Letters Patent.        Patented Oct. 8, 1918.

No Drawing.      Application filed July 11, 1918. Serial No. 244,426.

*To all whom it may concern:*

Be it known that I, JACOB BARAB, a citizen of the United States, residing at Dover, county of Morris, and State of New Jersey, have invented a new and useful Improvement in Processes of Separating Nut-Shells from Adherent Meats.

In the manufacture of dynamite, the use of the shells of nuts, in more or less finely ground form, as an absorbent or carrier for the nitroglycerin has been suggested, but more or less difficulty has been experienced in separating the shells from the meats adherent thereto. In the first instance, the larger part of the meats are removed from the shells by manufacturers of food products, who dispose of the shells to the explosives manufacturer. The shells thus received by the explosives manufacturer have more or less meat adherent thereto, and these should be completely and thoroughly removed before the shells are fit for use, as the presence in the explosives of any meaty particles or vegetable oil derived therefrom may cause serious deterioration of the explosive. Further, the presence of meats makes grinding and sieving of ground shells very difficult and in fact almost impossible under certain conditions. Efforts to effect this thorough and complete separation have not been heretofore effective. For example, I have immersed the shells in water or in brine (dependent upon the specific gravity of the particular shells being treated), accompanied by more or less agitation, until the detachment of the meats from the shells is effected, after which the shells are allowed to sink by gravity, the meats rising to and floating on the surface. This method of operation is, however, not efficient, and is particularly unsatisfactory as applied to shells of certain nuts, such as walnuts and pecans; and moreover, even if it could be accomplished, the time required would be prohibitive.

In the case of walnuts, I have attained the nearest approximation to success by the use of brine, but I have not been able to secure satisfactory results in the absence of special treatment, which I will now describe.

The shells, with the meats adherent thereto, or mixed with detached pieces of the meats, are introduced into boiling water and allowed to remain therein for about twenty minutes, at the end of which period everything has sunk to the bottom. The water is then drawn off and about a ten per cent. salt solution introduced. After a short period of time the meats float to the surface, the shells and chaff remaining on the bottom.

Alternatively, the shells may be boiled or heated directly in the salt solution and after about twenty minutes the meats will float to the surface and can be readily separated. This treatment is not preferred, however, because, during boiling, considerable foreign matter is taken up by the liquid and the same liquid cannot, therefore, be repeatedly used; thus entailing considerable loss of salt. By first treating with fresh water all the foreign matter is removed thereby and the salt water may be recovered in condition for further use.

The use of this process is not restricted to walnut shells, but may be applied to other nut shells in which the nuts and meats have specific gravities adapting them for separation in brine.

While in the case of pecan shells the use of fresh heated water at a temperature considerably below the boiling point is practicable, the treatment of walnut shells requires a liquid of higher specific gravity and the temperature of the water, in the preferred process, or of the brine in the second process, should not be far from the boiling point, the use of an actually boiling liquid being preferred.

The explanation of the success of the process is found not merely or chiefly in the direct tendency of the high temperature to more completely detach the meats from the shells but also and principally in the change produced by the liquid in the absolute and relative densities of the shells and meats.

While a small proportion of shell particles or chaff may rise to the surface with the meats, no meat particles will sink with the shells, the latter being recoverable in a clean condition.

The treatment preferred for pecan shells is not herein claimed, as the same is more particularly described and also specifically claimed in a separate application, Serial No. 224,425, filed of even date herewith, said application also containing claims for features of novelty common to the processes of both applications.

Having now fully described my invention, what I claim and desire to protect by Letters Patent is:

1. The process of separating nut shells from meats which comprises both heating them and effecting their separation through the medium of liquid, the liquid in which the separation is effected having a specific gravity above that of water and between the specific gravities of the meats and the shells.

2. The process of separating nut shells from meats which comprises both heating them and effecting their separation through the medium of liquid, the temperature in the heating operation approximating 100 degrees centigrade and the separation being effected by gravity in a solution of salt and water.

3. The process of separating nut shells from meats which comprises first treating them in heated water and then effecting their separation in a liquid of higher specific gravity than water.

4. The process of separating nut shells from meats which comprises first treating them in water at a temperature approximating its boiling point, and then effecting their separation in a liquid having a specific gravity between the specific gravities of the meats and the shells.

5. The process of separating nut shells from meats which comprises first treating them in water at a temperature approximating its boiling point to effect the detachment from the shells of the meats adherent thereto, and then introducing them into a solution of salt and water in which the shells sink by gravity and the meats rise to the surface.

In testimony of which invention I have hereunto set my hand at Kenvil, N. J., on this 3rd day of July, 1918.

JACOB BARAB.